(12) United States Patent
Hettinger

(10) Patent No.: US 6,293,308 B1
(45) Date of Patent: Sep. 25, 2001

(54) MINIATURIZED VALVE MECHANISM

(75) Inventor: Christoph Hettinger, Ingelfingen (DE)

(73) Assignee: Burkert Werke GmbH & Co. (DE)

( * ) Notice: Subject to any disclaimer, the term of this patent is extended or adjusted under 35 U.S.C. 154(b) by 0 days.

(21) Appl. No.: 09/553,387

(22) Filed: Apr. 20, 2000

Related U.S. Application Data

(62) Division of application No. 09/093,791, filed on Jun. 9, 1998, now Pat. No. 6,076,555.

(30) Foreign Application Priority Data

Jun. 9, 1997 (DE) .......................... 297 10 006 U

(51) Int. Cl.[7] .............. F16K 11/06; F16K 31/02
(52) U.S. Cl. ................. 137/625.5; 137/625.69; 137/625.65; 251/129.06
(58) Field of Search ............... 251/129.06; 137/625.65, 137/625.69, 625.5

(56) References Cited

U.S. PATENT DOCUMENTS

| | | | |
|---|---|---|---|
| 3,524,474 | 8/1970 | McCormick | 251/129.06 X |
| 4,284,263 * | 8/1981 | Newcomb | 251/129.06 |
| 4,298,181 | 11/1981 | Corrado et al. | 251/129.06 |
| 4,581,624 | 4/1986 | O'Connor | 251/129.06 |
| 4,669,660 | 6/1987 | Weber et al. | 251/129.06 X |
| 4,903,732 * | 2/1990 | Allen | 137/625.65 |
| 4,967,794 * | 11/1990 | Tsutsui et al. | 251/129.06 X |
| 5,148,833 | 9/1992 | Ota | 251/129.06 X |
| 5,161,774 | 11/1992 | Engelsdorf et al. | 251/129.06 X |
| 5,209,453 | 5/1993 | Aota et al. | 251/129.06 X |
| 5,238,223 | 8/1993 | Mettner et al. | 251/129.06 X |
| 5,328,149 * | 7/1994 | Reuter | 251/129.06 |
| 6,003,836 * | 12/1999 | Cewers | 251/129.06 |

* cited by examiner

Primary Examiner—John Rivell
(74) Attorney, Agent, or Firm—Nixon Peabody LLP; Stuart J. Friedman

(57) ABSTRACT

A miniaturized valve mechanism which has a valve containing a channel with at least one inlet and one outlet opening, as well as a device for closing the channel. In order to provide a valve arrangement which can be produced in the smallest possible size, the valve is controlled by a very small linear motor, the driver of which moves the device for closing and opening the channel by the application of a control voltage to a piezoelectric tube.

6 Claims, 1 Drawing Sheet

MINIATURIZED VALVE MECHANISM

Figure 1:
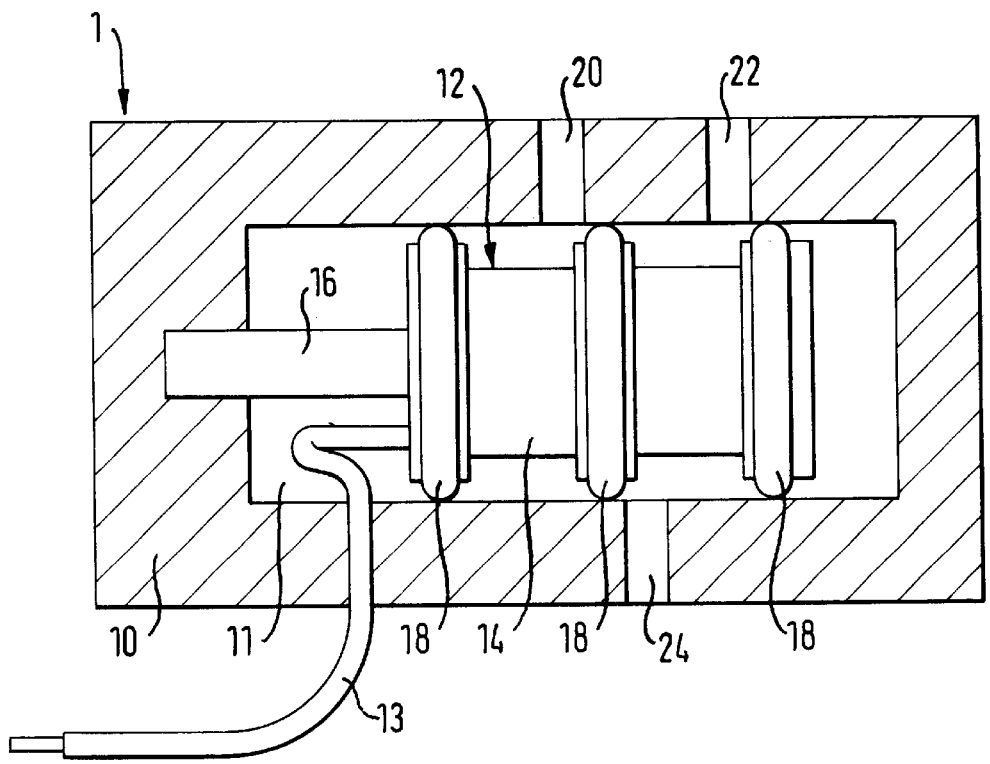

This application is a Divisional of application Ser. No. 09/093,791, filed Jun. 9, 1998 now U.S. Pat. No. 6,076,555.

The invention relates to a miniaturized valve mechanism with a small-size linear motor for the actuation of the valve.

The smallest possible size of valves of conventional design is determined by the size of the control mechanism, where smaller sizes are made possible by direct-action solenoid drives.

New technologies, such as the micro systems technology, create a demand for ever smaller and more complex devices, machines and systems. Areas of application for some of these can already be found in medical, measurement, communications and biotechnological fields, as well as in physics and in chemistry.

The need arises in some of these areas to meter, mix, etc. extremely small amounts of fluids, and to this purpose there is a trend to develop valves and applications of very small size.

A linear motor of small size is known, where the mode of operation is based on the piezoelectric effect. This very small linear motor is already used for measurement and positioning applications in the nanometer range.

A driver is radially enclosed by a small piezoelectric tube with two electrodes. If a voltage is applied to the two electrodes, the piezoelectric tube will expand. This expansion is transmitted to the driver, which is pushed out of the piezoelectric tube. If the linear motor is subjected to voltage pulses, longer strokes can be achieved. Because of its mass moment of inertia, the driver does not follow the rapid movements of the piezoelectric crystal, but continues its movement in relation to the piezoelectric unit by a small amount with every voltage pulse applied, and when these pulses are repeated, the movement extends into the millimeter range. Under no-voltage conditions, the driver of the miniaturized linear motor remains locked in its acquired position with sufficient firmness to prevent the heaviest load that it is capable of lifting from pushing the driver back. The linear motor can be calibrated down into the nanometer range.

It is the object of the invention to provide a valve mechanism which is driven by a linear micro motor and that can be produced in the smallest possible size. Miniaturized valve mechanisms produced according to the invention may be made in a great variety of embodiments.

One embodiment of a micro valve mechanism has two plate shaped valve elements, of which one, containing a plurality of trapezoidal valve seats, is firmly connected to the housing. The second element contains an equal number of closing bodies in a complementary arrangement with the valve seats. According to the invention, this closing body element is firmly connected to a moving part which, in turn, is connected to the driver of the linear motor, or to a driver extension carrier tube, respectively, preferably by means of a screwed joint. This measure provides a simple way to separate the piezoelectric drive from the fluidic part of the valve without having to interfere with the fluid circuit. To this purpose, the fluid housing is separated from the miniaturized linear motor by means of sealing joints.

According to the invention, a simple 2-way or 3-way open/close valve can be achieved in that the driver of the miniaturized linear motor is calibrated to two defined end positions. One or more voltage pulses open the valve up to the pre-defined end position, and voltage pulses of opposed polarity once again close the valve.

On the basis of the proposed arrangement, it is furthermore an easy matter to produce a proportional flow valve. The driver of the linear motor moves the device governing the opening and closing of the valve proportionally to a pre-determined standard value.

A further valve mechanism embodiment, in accordance with the invention, is obtained when the miniaturized linear motor is used in conjunction with a toggle valve. Such valves are known from DE 44 25 540 A1, and are characterized by their modular construction and their reduced space requirement. The fluidic part with at least one inlet and one outlet port contains, for the purpose of opening and closing the valve, a toggle member consisting of a magnetizable metal which is held in a defined position by means of a spring. The fluid housing is separated from the drive by means of a metallic plate. This plate is non-magnetic and contains two magnetic inserts arranged above the toggle member.

For the purpose of opening and closing the valve, the driver of the miniaturized linear motor moves a magnetic system friction-free between lateral guides over this plate.

The valve mechanism according to the invention and in its starting position is deenergized. The driver of the miniaturized linear motor keeps the permanent system on the non-magnetized part of the separating plate. The toggle member is held in a holding position by means of a return spring. The piezoelectric tube is now subjected to as many voltage pulses as are required until the driver of the linear motor has moved the magnetic system over the magnetic parts of the separating plate. Magnetic energy is then allowed to flow and tends to close the magnetic circuit. The toggle member is attracted against the holding force of the return spring and opens one valve port whilst closing the other. The driver of the linear motor with the magnetic system, remain in this position until once again voltage pulses of opposed polarity return the driver, together with the magnetic system, to its starting position. The magnetic force becomes smaller than the force of the return springs and the toggle member is therefore reset into its starting position.

Figure 2:
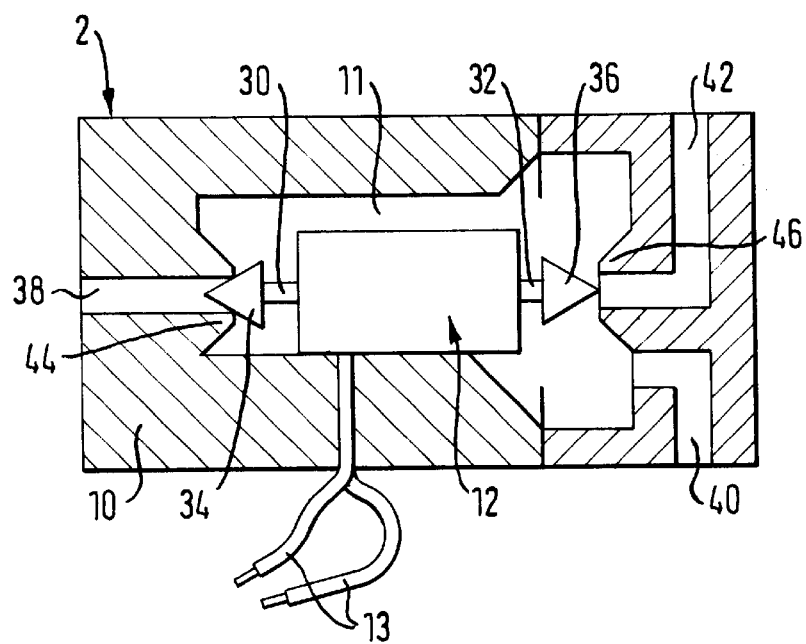

The attached drawings illustratrate two embodiments of valve mechanisms which are actuated by a miniaturized linear motor, where FIG. 1 shows a sectional view of a slide valve according to an embodiment of the invention, and FIG. 2 shows a sectional view of a seat valve according to a further embodiment of the invention.

The valve mechanism of a slide valve 1 shown in FIG. 1 has a housing 10 with a cavity 11. A miniaturized linear motor 12 with a movable driver 14, which receives its control voltage pulses via an electrical lead 13, is arranged inside the valve chamber 11 of the housing 10. The driver 14 is arranged so that it can move along a fixed shaft 16 which is fixed to the housing 10. The driver 14 carries circumferential seals 18, one at a distance from the others, for the purpose of sealing. The housing 10 is provided with a pressure connection 20, a venting connection 22 and a working connection 24, which consist in each case of a bore which, starting from the outside of the housing 10, opens out into the cavity 11. Depending on the position of the driver 14 within the cavity 11, the circumferential seals 18, which are arranged on the driver 14 and which seal this against the cavity 11, cause different channels between the pressure connection 20, the venting connection 22 or the working connection 24 to open or to close, respectively. The embodiment shown in FIG. 1 may be designed as either a three-way, a four-way or a five-way valve.

FIG. 2 shows a valve mechanism according to the invention, representing a seat valve 2. This, too, has a housing 10 which surrounds a cavity 11. In the same way, a miniaturized linear motor 12 is fitted inside the cavity 11, which is controlled via an electrical lead 13 and which has two movable shafts 30 and 32. Each of these movable shafts 30 and 32 carries a seat seal 34 or 36, respectively. The housing 10 is provided with a venting connection 38, a working connection 40 and a pressure connection 42, which consists of bores extending from the outside of the housing 10 into the cavity 11. A valve seat 44 is formed at the mouth of the bore which corresponds to the venting connection 38 and which leads into the cavity 11. In the same way, a valve seat 46 is provided at the bore corresponding to the pressure connection 42. When a control voltage is applied to the linear motor 12 via the electrical lead 13, the movable shafts 30, 32 are either pushed forward or retracted, so that the seat seals 34 or 36, respectively, either make contact or lift away from the valve seats 44 or 46, respectively. This not only allows channels between the venting connection 38, the working connection 40 or the pressure connection 42 to be opened or closed, but also allows for intermediate positions. The seat valve shown in FIG. 2 therefore fulfils the functions of open/close or proportional.

What is claimed is:

1. A miniaturized valve mechanism for applications in the nanometer range comprising a valve housing defining a valve chamber with at least one inlet and two outlet ports, said inlet and outlet ports communicating through said valve chamber, said outlet ports being formed as valve seats, and a miniaturized linear drive accommodated within said valve chamber and comprising a tube of piezoelectric material having a pair of electrodes, said linear drive having a pair of shaft sections, each of said shaft sections carrying a seat seal, said shaft sections being commonly axially movable upon application of electric pulses to said electrodes, whereby said seat seals on said shaft sections directly contact or lift away from said valve seats to seal one of said outlet ports while simultaneously opening the other one of said outlet ports.

2. The valve mechanism of claim 1, wherein said tube is fixed to said housing.

3. The valve mechanism of claim 2, wherein first and second outlet port valve seats are aligned with each other in an axial direction of said tube and are located on opposite sides of said valve chamber, said linear drive having a first and a second shaft carrying first and second seat seals cooperating with said first and second valve seats, respectively, said tube and said first and second shafts being arranged axially between said first and second valve seats.

4. The valve mechanism of claim 1, wherein said linear drive is responsive to said electric pulses substantially proportionally to the number of pulses applied.

5. The valve mechanism of claim 1, wherein said linear drive moves said shaft incrementally in discrete steps.

6. The valve mechanism of claim 1, wherein said seat seal assumes a stable position within said valve chamber when said linear drive is not activated.

* * * * *